US012625702B2

(12) United States Patent
Gildein et al.

(10) Patent No.: US 12,625,702 B2
(45) Date of Patent: May 12, 2026

(54) REAL-TIME VALIDATION OF MICROCODE UPDATES

(71) Applicant: INTERNATIONAL BUSINESS MACHINES CORPORATION, Armonk, NY (US)

(72) Inventors: Michael E Gildein, Wappingers Falls, NY (US); Tabari Alexander, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 18/532,191

(22) Filed: Dec. 7, 2023

(65) Prior Publication Data

US 2025/0190214 A1 Jun. 12, 2025

(51) Int. Cl.
*G06F 9/22* (2006.01)
*G06F 8/65* (2018.01)

(52) U.S. Cl.
CPC ............... *G06F 9/223* (2013.01); *G06F 8/65* (2013.01)

(58) Field of Classification Search
CPC ............................ G06F 9/223; G06F 8/60–66
USPC .................................................. 717/168–178
See application file for complete search history.

(56) References Cited

U.S. PATENT DOCUMENTS

| | | | | |
|---|---|---|---|---|
| 4,459,666 | A | * 7/1984 | Kruger | G06F 9/267 |
| | | | | 712/231 |
| 5,410,686 | A | * 4/1995 | Kish | G06F 11/323 |
| | | | | 714/E11.181 |
| 9,213,537 | B2 | 12/2015 | Bandakka et al. | |
| 11,023,220 | B2 | 6/2021 | Samuel et al. | |
| 2021/0240468 | A1 | 8/2021 | Shanmugam et al. | |
| 2023/0031974 | A1 | 2/2023 | Suryanarayana et al. | |

OTHER PUBLICATIONS

Microcode, Wikipedia, 2022, 16 pages, [retrieved on Dec. 19, 2025], Retrieved from the Internet: <URL:https://web.archive.org/web/20221204070339/https://en.wikipedia.org/wiki/Microcode>.*

* cited by examiner

*Primary Examiner* — Geoffrey R St Leger
(74) *Attorney, Agent, or Firm* — Onyx IP Group

(57) ABSTRACT

Real-time validation of microcode updates may include: executing a workload on at least one first processor having a first version of a microcode instruction set; executing the workload on at least one second processor having a second version of a microcode instruction set, wherein the second version of the microcode instruction set comprises an update of the first version of the microcode instruction set; and validating the second version of the microcode instruction set based on a comparison of output from executing the workload using the at least one first processor and output from executing the workload using the at least one second processor.

20 Claims, 6 Drawing Sheets

Execute A Workload On At Least One First Processor Having A First Version Of A Microcode Instruction Set 202

Execute The Workload On At Least One Second Processor Having A Second Version Of A Microcode Instruction Set, Wherein The Second Version Of The Microcode Instruction Set Comprises An Update Of The First Version Of The Microcode Instruction Set 204

Validate The Second Version Of The Microcode Instruction Set Based On A Comparison Of Output From Executing The Workload Using The At Least One First Processor And Output From Executing The Workload Using The At Least One Second Processor 206

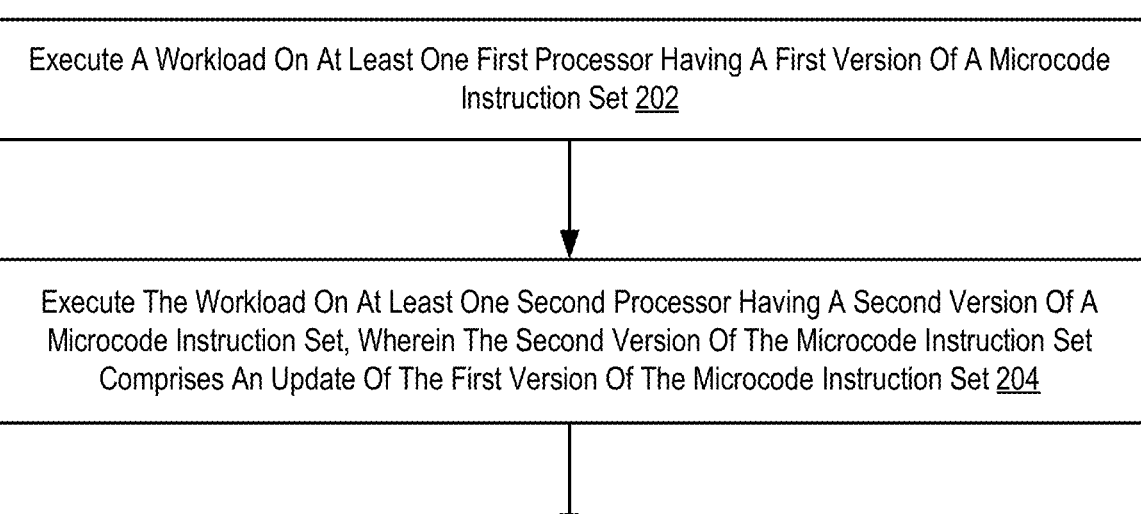

Execute A Workload On At Least One First Processor Having A First Version Of A Microcode Instruction Set 202

Execute The Workload On At Least One Second Processor Having A Second Version Of A Microcode Instruction Set, Wherein The Second Version Of The Microcode Instruction Set Comprises An Update Of The First Version Of The Microcode Instruction Set 204

Validate The Second Version Of The Microcode Instruction Set Based On A Comparison Of Output From Executing The Workload Using The At Least One First Processor And Output From Executing The Workload Using The At Least One Second Processor 206

FIG. 2

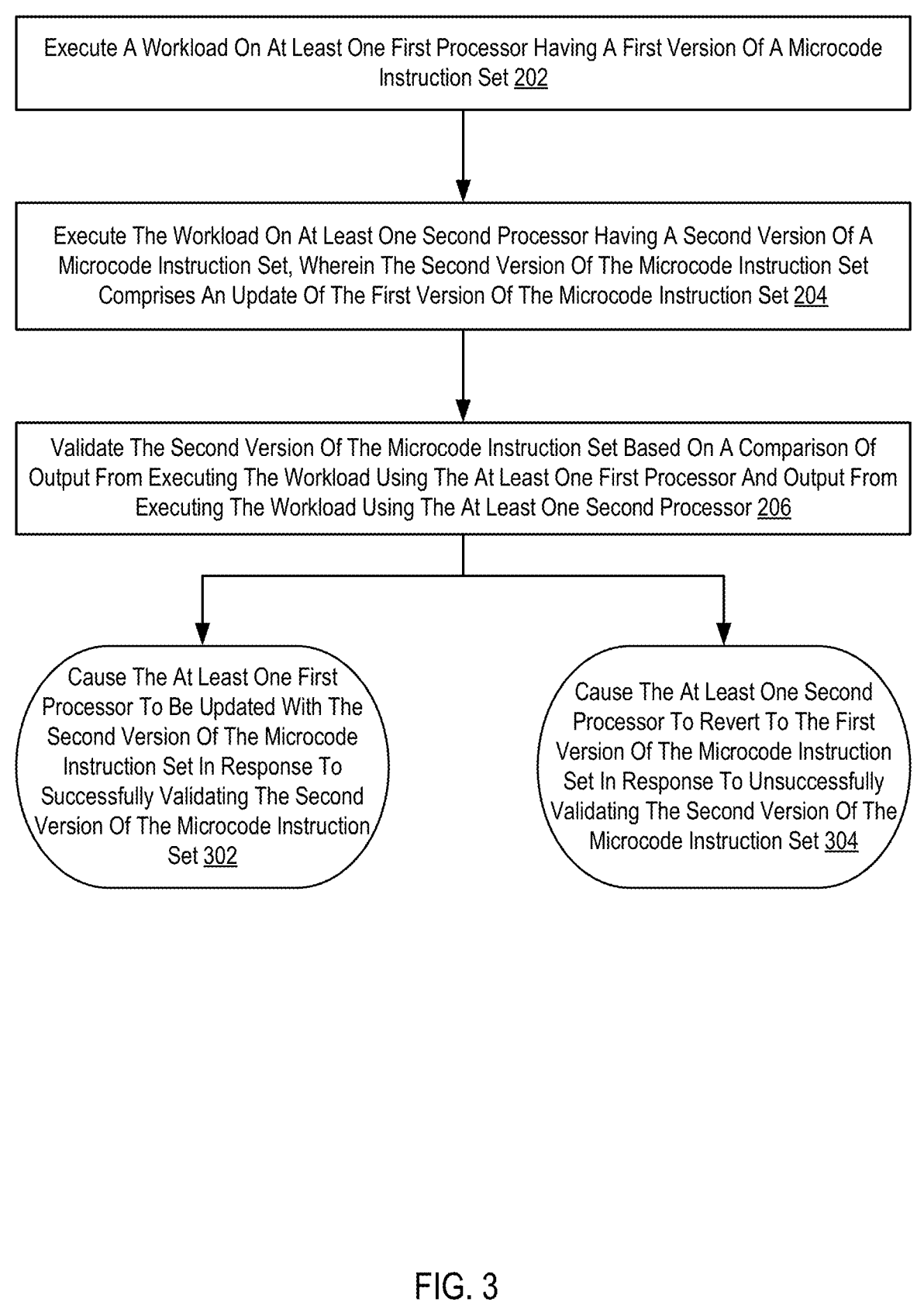

Execute A Workload On At Least One First Processor Having A First Version Of A Microcode Instruction Set <u>202</u>

Execute The Workload On At Least One Second Processor Having A Second Version Of A Microcode Instruction Set, Wherein The Second Version Of The Microcode Instruction Set Comprises An Update Of The First Version Of The Microcode Instruction Set <u>204</u>

Validate The Second Version Of The Microcode Instruction Set Based On A Comparison Of Output From Executing The Workload Using The At Least One First Processor And Output From Executing The Workload Using The At Least One Second Processor <u>206</u>

Cause The At Least One First Processor To Be Updated With The Second Version Of The Microcode Instruction Set In Response To Successfully Validating The Second Version Of The Microcode Instruction Set <u>302</u>

Cause The At Least One Second Processor To Revert To The First Version Of The Microcode Instruction Set In Response To Unsuccessfully Validating The Second Version Of The Microcode Instruction Set <u>304</u>

FIG. 3

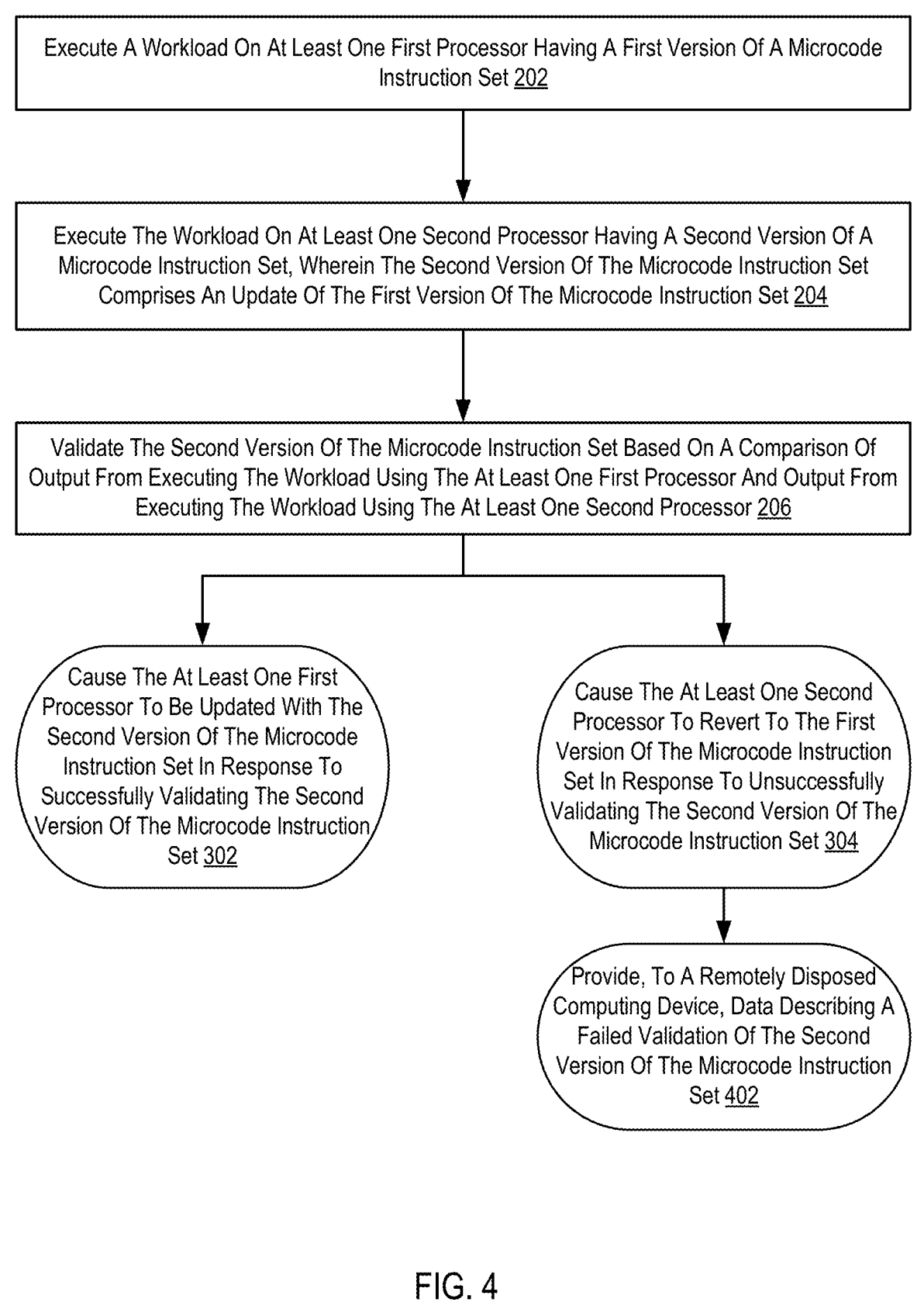

Execute A Workload On At Least One First Processor Having A First Version Of A Microcode Instruction Set 202

Execute The Workload On At Least One Second Processor Having A Second Version Of A Microcode Instruction Set, Wherein The Second Version Of The Microcode Instruction Set Comprises An Update Of The First Version Of The Microcode Instruction Set 204

Validate The Second Version Of The Microcode Instruction Set Based On A Comparison Of Output From Executing The Workload Using The At Least One First Processor And Output From Executing The Workload Using The At Least One Second Processor 206

Cause The At Least One First Processor To Be Updated With The Second Version Of The Microcode Instruction Set In Response To Successfully Validating The Second Version Of The Microcode Instruction Set 302

Cause The At Least One Second Processor To Revert To The First Version Of The Microcode Instruction Set In Response To Unsuccessfully Validating The Second Version Of The Microcode Instruction Set 304

Provide, To A Remotely Disposed Computing Device, Data Describing A Failed Validation Of The Second Version Of The Microcode Instruction Set 402

FIG. 4

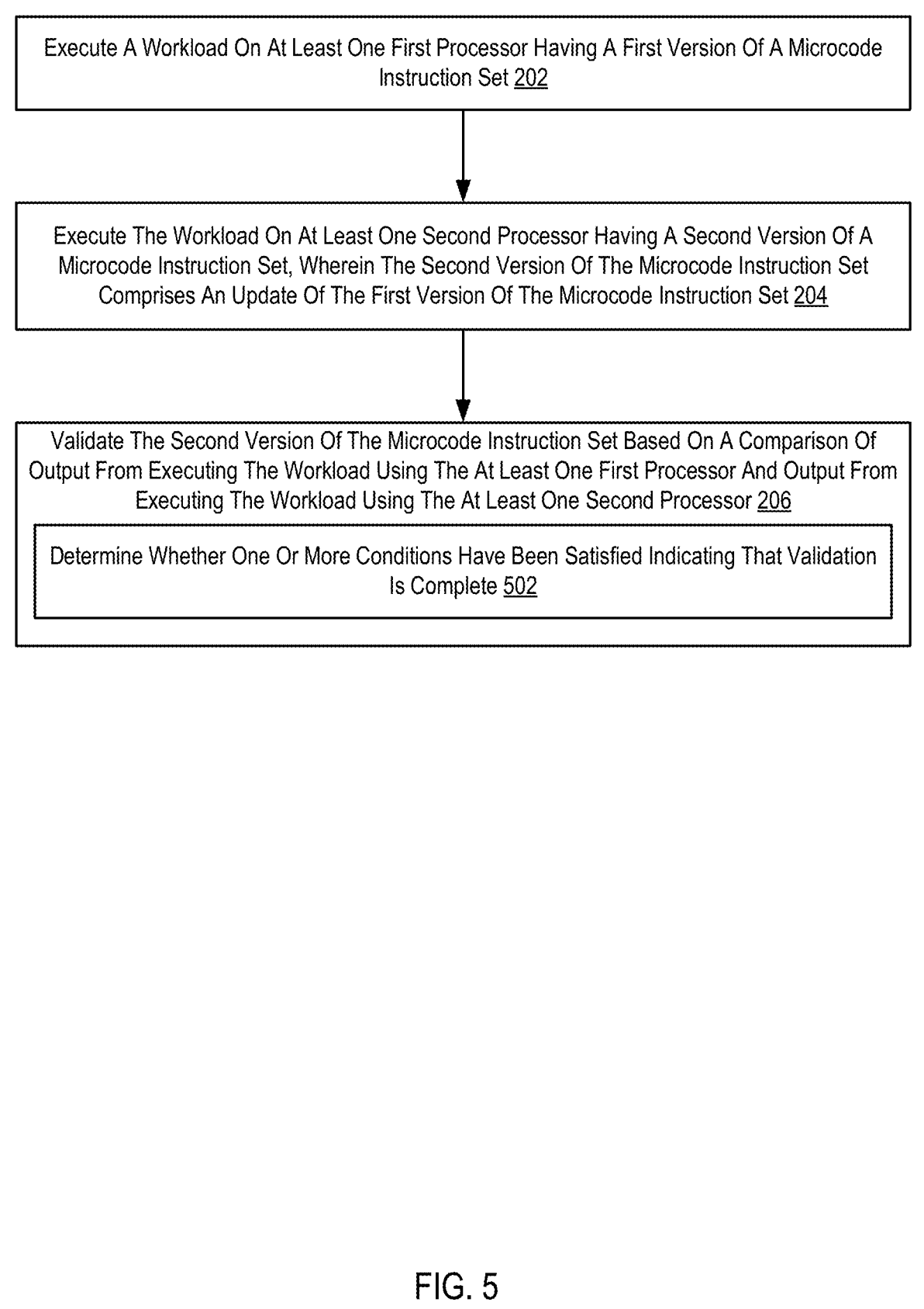

Execute A Workload On At Least One First Processor Having A First Version Of A Microcode Instruction Set 202

Execute The Workload On At Least One Second Processor Having A Second Version Of A Microcode Instruction Set, Wherein The Second Version Of The Microcode Instruction Set Comprises An Update Of The First Version Of The Microcode Instruction Set 204

Validate The Second Version Of The Microcode Instruction Set Based On A Comparison Of Output From Executing The Workload Using The At Least One First Processor And Output From Executing The Workload Using The At Least One Second Processor 206

Determine Whether One Or More Conditions Have Been Satisfied Indicating That Validation Is Complete 502

FIG. 5

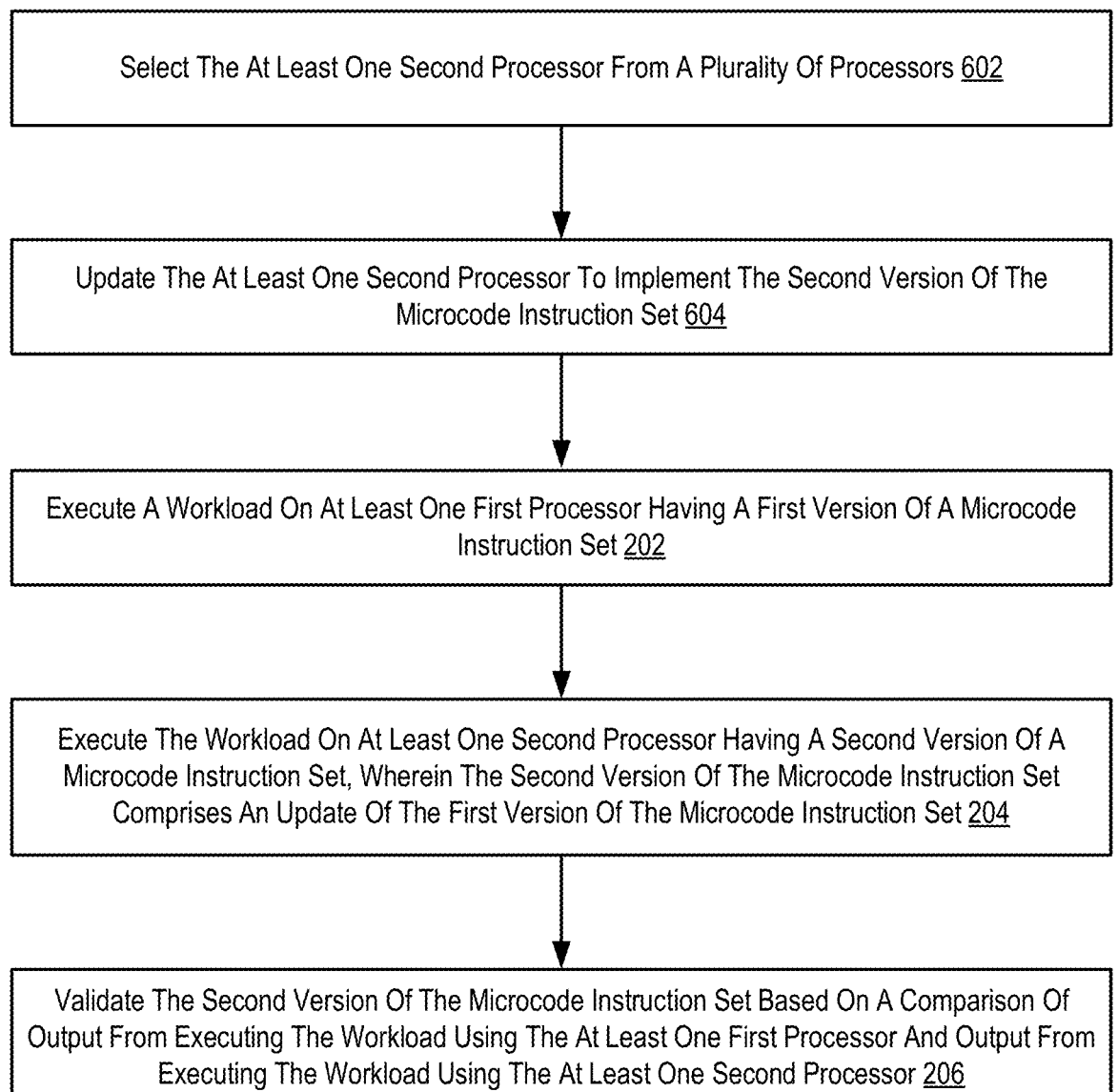

Select The At Least One Second Processor From A Plurality Of Processors 602

Update The At Least One Second Processor To Implement The Second Version Of The Microcode Instruction Set 604

Execute A Workload On At Least One First Processor Having A First Version Of A Microcode Instruction Set 202

Execute The Workload On At Least One Second Processor Having A Second Version Of A Microcode Instruction Set, Wherein The Second Version Of The Microcode Instruction Set Comprises An Update Of The First Version Of The Microcode Instruction Set 204

Validate The Second Version Of The Microcode Instruction Set Based On A Comparison Of Output From Executing The Workload Using The At Least One First Processor And Output From Executing The Workload Using The At Least One Second Processor 206

FIG. 6

REAL-TIME VALIDATION OF MICROCODE UPDATES

BACKGROUND

The present disclosure relates to methods, apparatus, and products for real-time validation of microcode updates.

SUMMARY

According to embodiments of the present disclosure, various methods, apparatus and products for real-time validation of microcode updates are described herein. In some aspects, real-time validation of microcode updates includes executing a workload on at least one first processor having a first version of a microcode instruction set; executing the workload on at least one second processor having a second version of a microcode instruction set, wherein the second version of the microcode instruction set comprises an update of the first version of the microcode instruction set; and validating the second version of the microcode instruction set based on a comparison of output from executing the workload using the at least one first processor and output from executing the workload using the at least one second processor. In some aspects, an apparatus may include a processing device; and memory operatively coupled to the processing device, wherein the memory stores computer program instructions that, when executed, cause the processing device to perform this method. In some aspects, a computer program product comprising a computer readable storage medium may store computer program instructions that, when executed, perform this method.

BRIEF DESCRIPTION OF THE DRAWINGS

FIG. 2 sets forth a flowchart of an example method for real-time validation of microcode updates in accordance with some embodiments of the present disclosure.

FIG. 3 sets forth a flowchart of another example method for real-time validation of microcode updates in accordance with some embodiments of the present disclosure.

FIG. 4 sets forth a flowchart of another example method for real-time validation of microcode updates in accordance with some embodiments of the present disclosure.

FIG. 5 sets forth a flowchart of another example method for real-time validation of microcode updates in accordance with some embodiments of the present disclosure.

FIG. 6 sets forth a flowchart of another example method for real-time validation of microcode updates in accordance with some embodiments of the present disclosure.

DETAILED DESCRIPTION

Figure 1:
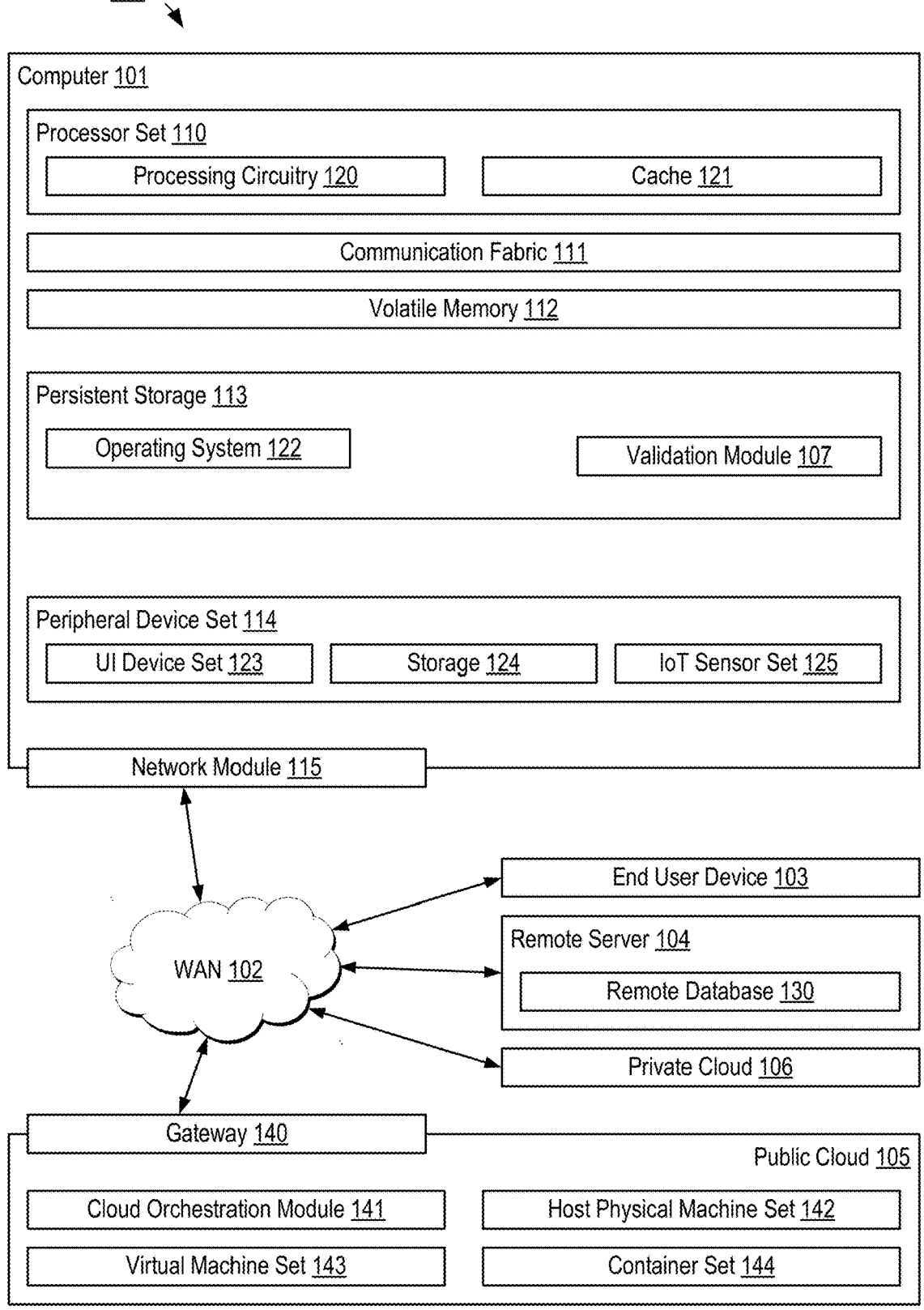
FIG. 1 sets forth an example computing environment for real-time validation of microcode updates in accordance with some embodiments of the present disclosure.

Certain processor architectures utilize a lower-level microcode instruction set that may be updated as part of a firmware update process. Though updates to a microcode instruction set are generally tested and validated prior to being pushed via a firmware update, certain errors may only be discovered when executed by a client using their particular production workflows. Accordingly, it may be beneficial to validate updates to microcode instruction sets using client-specific workloads.

With reference now to FIG. 1, shown is an example computing environment according to aspects of the present disclosure. Computing environment 100 contains an example of an environment for the execution of at least some of the computer code involved in performing the various methods described herein, such as the validation module 107. In addition to block 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment

100, at least some of the instructions for performing the computer-implemented methods may be stored in block 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

For further explanation, FIG. 2 sets forth a flowchart of an example method of real-time validation of microcode updates in accordance with some embodiments of the present disclosure. The method of FIG. 2 may be performed, for example, using the validation module 107 of FIG. 1. The method of FIG. 2 includes executing 202 a workload on at least one first processor having a first version of a microcode instruction set. As described in FIG. 2, the first version of the microcode instruction set includes a version of a microcode instruction set prior to some update to the microcode instruction set (e.g., using a firmware update or some other update as can be appreciated).

As described herein, a workload may include any set of executable instructions, commands, steps, and the like. For example, the workload may include a test suite, production software, test software, scripts, or other executable commands as can be appreciated. As another example, the workload may correspond to user-input commands or may be generated in response to various user-input commands, such as interaction with some software. In some embodiments, the workload may be encoded or defined at the microcode instruction level or a higher level of code or software as can be appreciated. The workload, when executed by the at least one processor, causes the at least one processor to use the first version of the microcode instruction set.

The method of FIG. 2 also includes executing 204 the workload on at least one second processor having a second version of a microcode instruction set, wherein the second version of the microcode instruction set comprises an update of the first version of the microcode instruction set. In other words, while the at least one first processor executes the workload using the version of the microcode instruction set prior to the update, the at least one second processor executes the workload using the version of the microcode instruction set reflecting the update. The at least one second processor may be selected for using the updated microcode instruction set according to a variety of approaches, as will be described in further detail below. For example, in an architecture of N processors, a single processor may be selected (e.g., as a second processor) to use the updated microcode instruction set with N−1 other processors (e.g., first processors) using the microcode instruction set prior to update.

Executing 204 the workload on the at least one second processor causes duplicate instances of the workload to be executed on the at least one first processor and the at least one second processor. Put differently, each processor of the at least one first processor and the at least one second processor is executing a separate instance of the workload such that each command or instruction is repeatedly executed across the different processors using their respective instruction sets. For example, assuming a single first processor and second processor, each of the first processor and the second processor will separately execute the commands of the workload using their respective instruction sets (e.g., in contrast to distributing the workload across multiple processors).

In some embodiments, the at least one first processor and the at least one second processor may execute the workload at least substantially in parallel. For example, in some embodiments, the at least one first processor and the at least one second processor may execute the workload in parallel such that each microcode instruction of the workload is executed on both the at least one processor and the at least one second processor at the same time or approximately the same time. As another example, in some embodiments, the at least one first processor and the at least one second processor may execute the workload offset by some number of instructions or cycles. For example, the at least one second processor may execute the workload some defined number of cycles or instructions behind or ahead of the at least one first processor.

The method of FIG. 2 also includes validating 206 the second version of the microcode instruction set based on a comparison of output from executing the workload using the at least one first processor and output from executing the workload using the at least one second processor. Validating 206 the second version of the microcode instruction set is based on a comparison of output from executing the workload using the at least one first processor and output from executing the workload using the at least one second processor in that the output or result of each microcode instruction executed by the at least one first processor (e.g., using the first version of the microcode instruction set) is compared to the output or result of the corresponding microcode instruction as executed by the at least one second processor (e.g., using the second version of the microcode instruction set). Put differently, validating 206 the second version of the microcode instruction set includes a microcode instruction-level comparison of the workload as executed on the at least one first processor to the workload as executed on the at least one second processor.

For example, validating execution of a particular microcode instruction of the second version of the microcode instruction set may include validating that the same result or output is generated when executing the particular microcode instruction using the first version of the microcode instruction set. In other words, where a particular microcode instruction should perform identically across the first and second microcode instruction set, validating 206 the second version of the microcode instruction set may include determining that each instance where the particular microcode instruction is executed results in the same output across the first instruction set and the second instruction set.

As another example, validating execution of a particular microcode instruction of the second version of the microcode instruction set may include validating that a different result or output is generated when executing the particular microcode instruction using the first version of the microcode instruction set. In other words, where a particular microcode instruction should perform differently across the first and second microcode instruction set, validating 206 the second version of the microcode instruction set may include determining that the output of executing the microcode instruction using the second microcode instruction set differs from the output of executing the microcode instruction set in the correct or expected manner. Continuing with this example, assume that a change to a microcode instruction set causes a particular microcode instruction to round its output up instead of down. Accordingly, execution of this instruction in the second version of the microcode instruction set may include determining that the output of this instruction is always one greater than the output of executing this microcode instruction using the first version of the microcode instruction set (e.g., due to rounding up instead of down).

As a further example, validating 206 the second version of the microcode instruction set may also include detecting any errors or faults in executing the workload using the second version of the microcode instruction set such that execution of a particular microcode instruction cannot be completed. Accordingly, in some embodiments, validating 206 the second version of the microcode instruction set includes validating that the output of each executed microcode instruction using the second version of the microcode instruction set matches or differs as appropriate from its execution using the first version of the microcode instruction set, and validating that the workload is executed without error.

As will be set forth in further detail below, validation 206 of the second version of the microcode instruction set may continue until a condition indicating a failed validation is encountered (e.g., an output of different versions of a microcode instruction not matching or different as appropriate, or a fault preventing execution of a microcode instruction is encountered), or until some other condition is satisfied indicating that the workload has been executed to a sufficient degree using the second version of the microcode instruction set that it may be deemed valid. As will also be described in further detail below, various actions may be taken in response to a failed or successful validation of the second version of the microcode instruction set.

The approaches set forth herein allow for validation of updated microcode instruction sets using a limited subset of processors that have been updated to use this updated microcode instruction set. This ensures that performance of the microcode instruction set may be validated against client-specific workloads without requiring all processors to be updated to an as-yet-unvalidated microcode instruction set.

For further explanation, FIG. 3 sets forth a flowchart of another example method of real-time validation of microcode updates in accordance with some embodiments of the present disclosure. The method of FIG. 3 differs from FIG. 2 in that the method of FIG. 3 also includes: executing 202 a workload on at least one first processor having a first version of a microcode instruction set; executing 204 the workload on at least one second processor having a second version of a microcode instruction set, wherein the second version of the microcode instruction set comprises an update of the first version of the microcode instruction set; and validating 206 the second version of the microcode instruction set based on a comparison of output from executing the workload using the at least one first processor and output from executing the workload using the at least one second processor.

The method of FIG. 3 differs from FIG. 2 in that the method of FIG. 3 also includes causing 302 the at least one first processor to be updated with the second version of the microcode instruction set in response to successfully validating the second version of the microcode instruction set. As the at least one first processors are executing the first version of the microcode instruction set during validation, this allows the at least one first processors to be updated with the now-validated second version of the microcode instruction set.

In some embodiments, causing 302 the at least one first processor to be updated with the second version of the microcode instruction set may include storing instructions, commands, configuration information, and the like indicating that the at least one first processor should be updated during a next system restart. Thus, when the system restarts, the at least one first processor may be updated as part of a bootup process where configuration changes or other updates may be applied. In some embodiments, where system restart is not required to update the microcode instruction set of the at least one first processor, causing 302 the at least one first processor to be updated may include updating the at least one first processor to use the second version of the microcode instruction set. For example, power to the aet least one first processor may be temporarily severed such that firmware or other updates may be applied. Power may then be restored to these updated processors such that they may use the second version of the microcode instruction set.

The method of FIG. 3 further differs from FIG. 2 in that the method of FIG. 3 also includes causing 304 the at least one second processor to revert to the first version of the microcode instruction set in response to unsuccessfully validating the second version of the microcode instruction set. Thus, where validation of the second version of the microcode instruction set fails, the at least one second processor using the second version of the microcode instruction set may be updated to instead use the first version of the microcode instruction set. In some embodiments, causing 304 the at least one second processor to revert to the first version of the microcode instruction set may be performed using similar approaches as are set forth above with respect to causing 302 the at least one first processor to be updated with the second version of the microcode instruction set. For example, commands or configuration information may be stored that causes the at least one second processor to be updated on system restart. As another example, the at least one second processor may be updated without requiring system restart. In some embodiments, a signal may be sent to an operating system or other software to indicate that the at least one second processor should not be used until it has reverted back to the first version of the microcode instruction set (e.g., until system restart or another event).

For further explanation, FIG. 4 sets forth a flowchart of another example method of real-time validation of microcode updates in accordance with some embodiments of the present disclosure. The method of FIG. 4 differs from FIG. 3 in that the method of FIG. 4 also includes: executing 202 a workload on at least one first processor having a first version of a microcode instruction set; executing 204 the workload on at least one second processor having a second version of a microcode instruction set, wherein the second version of the microcode instruction set comprises an update of the first version of the microcode instruction set; validating 206 the second version of the microcode instruction set based on a comparison of output from executing the workload using the at least one first processor and output from executing the workload using the at least one second processor; causing 302 the at least one first processor to be updated with the second version of the microcode instruction set in response to successfully validating the second version of the microcode instruction set; and causing 304 the at least one second processor to revert to the first version of the microcode instruction set in response to unsuccessfully validating the second version of the microcode instruction set.

The method of FIG. 4 differs from FIG. 3 in that the method of FIG. 4 also includes providing 402, to a remotely disposed computing device, data describing a failed validation of the second version of the microcode instruction set. The remotely disposed computing device may include a computing device of a manufacturer of the at least one second processor, of a developer of the second version of the microcode instruction set, or another third party as can be appreciated. In some embodiments, the remotely disposed computing device may be associated with a designated user or team member of an organization whose computing devices received the second version of the microcode instruction set, such as an information technology (IT) team member, an administrator, and the like. This may facilitate troubleshooting the failed validation of the second version of the microcode instruction set.

In some embodiments, the data describing the failed validation of the second version of the microcode instruction set may indicate a particular microcode instruction whose execution caused validation to fail. For example, the data may indicate the particular microcode instruction, operands to the particular microcode instruction, and the like. The data may also indicate the result of execution of the particular microcode and why the result caused validation to fail (e.g., it differed from execution of the instruction using the first version of the microcode instruction set when it should have been identical, it was identical to execution of the instruction using the first version of the microcode instruction set when it should have differed). Where validation failed due to some encountered error or fault in execution, data describing the particular fault may be included. In some embodiments, the data describing the failed validation may indicate one or more previously executed microcode instructions prior to the microcode instruction that failed (e.g., the N previously executed microcode instructions prior to validation failing).

For further explanation, FIG. 5 sets forth a flowchart of another example method of real-time validation of microcode updates in accordance with some embodiments of the present disclosure. The method of FIG. 5 differs from FIG. 2 in that the method of FIG. 5 also includes: executing 202 a workload on at least one first processor having a first version of a microcode instruction set; executing 204 the workload on at least one second processor having a second version of a microcode instruction set, wherein the second version of the microcode instruction set comprises an update of the first version of the microcode instruction set; and validating 206 the second version of the microcode instruction set based on a comparison of output from executing the workload using the at least one first processor and output from executing the workload using the at least one second processor.

The method of FIG. 5 differs from FIG. 2 in that validating 206 the second version of the microcode instruction set based on a comparison of output from executing the workload using the at least one first processor and output from executing the workload using the at least one second processor also includes determining 502 whether one or more conditions have been satisfied indicating that validation is complete. As is set forth above, validation may be deemed to fail, and therefore validating 206 may end, in response to detecting particular conditions based on the output of particular microcode instructions across the first and second versions of the microcode instruction set (e.g., identical outputs that should be different, different outputs that should be identical, errors or faults in execution). So that parallel execution of the workload does not continue indefinitely during validation, there should be particular conditions that would deem validation to be successful if satisfied without some other failure condition being satisfied first. Particularly, such conditions may be used where the workload itself does not have some defined termination condition, such as completion of a particular test suite, benchmarking suite, and the like.

As an example, in some embodiments, the one or more conditions may include passage of a predefined duration (e.g., without a failure condition being detected). In some embodiments, the predefined duration may include a time duration, a number of cycles or instructions, and the like. As another example, in some embodiments, the one or more conditions may include a particular instruction or combination of instructions being executed some threshold number of times. As a further example, in some embodiments, the one or more conditions may include execution of each instruction in the second version of the microcode instruction set some number of times (e.g., at least once, or some other number).

One skilled in the art will appreciate that the particular conditions used to validate the second version of the microcode instruction set may vary according to particular design and engineering considerations, including the use case for the processors receiving the updated microcode instruction set. For example, a personal computer may use a less stringent set of conditions for validation, such as a short time duration having passed. In contrast, a pacemaker may require a more stringent set of conditions, such as passage of a longer duration or execution of the full microcode instruction set.

For further explanation, FIG. 6 sets forth a flowchart of another example method of real-time validation of microcode updates in accordance with some embodiments of the present disclosure. The method of FIG. 3 differs from FIG. 2 in that the method of FIG. 3 also includes: executing 202 a workload on at least one first processor having a first version of a microcode instruction set; executing 204 the workload on at least one second processor having a second version of a microcode instruction set, wherein the second version of the microcode instruction set comprises an update of the first version of the microcode instruction set; and validating 206 the second version of the microcode instruction set based on a comparison of output from executing the workload using the at least one first processor and output from executing the workload using the at least one second processor.

The method of FIG. 6 differs from FIG. 2 in that the method of FIG. 6 also includes selecting 602 the at least one second processor from a plurality of processors; and updating 604 the at least one second processor to implement the second version of the microcode instruction set. As is set forth above, a subset of system processors should be selected for running the second version of the microcode instruction set for parallel execution of the workload and validation. Accordingly, in some embodiments, various criteria may be used to select this subset of processors as the at least one second processor.

In some embodiments, the at least one second processor may be selected as an idle processor or a processor whose usage falls below some threshold. In some embodiments, a given second processor may be selected as sharing a cache with another processor that may execute the workload, thus causing this other processor to be the at least one first processor executing the workload for comparison. In other words, one or more pairs of processors may be selected for parallel execution of the workload, with a first processor of the pair using the first version of the microcode instruction set and a second processor of the pair using the second version of the microcode instruction set.

In some embodiments, the at least one second processor may be selected as a single second processor. In some embodiments, the at least one processor may include multiple second processors. In some embodiments, a may include multiple processors having different hardware configurations. For example, different processors may have different cache sizes or may have integrated graphics processing units (GPUs) or other accelerators. In such embodiments, a processor from each configuration may be selected as a second processor to run the second version of the microcode instruction set. Moreover, in such embodiments, first processors may also be selected from each configuration such that a pair of processors is selected for each processor configuration. During validation a workload (e.g., the same or different workloads) may be executed for each pair of processors, with each second processor being validated against the output of the corresponding first processor in the pair.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

executing a workload on at least one first processor having a first version of a microcode instruction set;

executing the workload on at least one second processor having a second version of a microcode instruction set, wherein the second version of the microcode instruction set comprises an update of the first version of the microcode instruction set; and validating the second version of the microcode instruction set based on a comparison of output from executing the workload using the at least one first processor and output from executing the workload using the at least one second processor.

2. The method of claim 1, wherein executing the workload on the at least one first processor and executing the workload on the at least one second processor are performed substantially in parallel.

3. The method of claim 1, further comprising causing the at least one first processor to be updated with the second version of the microcode instruction set in response to successfully validating the second version of the microcode instruction set.

4. The method of claim 1, further comprising causing the at least one second processor to revert to the first version of the microcode instruction set in response to unsuccessfully validating the second version of the microcode instruction set.

5. The method of claim 4, further comprising providing, to a remotely disposed computing device, data describing a failed validation of the second version of the microcode instruction set in response to unsuccessfully validating the second version of the microcode instruction set.

6. The method of claim 1, wherein validating the second version of the microcode instruction set comprises determining whether one or more conditions have been satisfied indicating that validation is complete.

7. The method of claim 6, wherein the one or more conditions comprise executing a full instruction set for the second version of the microcode instruction set.

8. The method of claim 6, wherein the one or more conditions comprise passage of a predefined time duration without a failed validation.

9. The method of claim 6, wherein the one or more conditions comprise execution of a particular instruction a predefined number of times without a failed validation.

10. The method of claim 1, further comprising:

selecting the at least one second processor from a plurality of processors; and updating the at least one second processor to implement the second version of the microcode instruction set.

11. An apparatus comprising:

a processing device; and memory operatively coupled to the processing device, wherein the memory stores computer program instructions that, when executed, cause the processing device to:

execute a workload on at least one first processor having a first version of a microcode instruction set;

execute the workload on at least one second processor having a second version of a microcode instruction set, wherein the second version of the microcode instruction set comprises an update of the first version of the microcode instruction set; and validate the second version of the microcode instruction set based on a comparison of output from executing the workload using the at least one first processor and output from executing the workload using the at least one second processor.

12. The apparatus of claim 11, wherein executing the workload on the at least one first processor and executing the workload on the at least one second processor are performed substantially in parallel.

13. The apparatus of claim 11, wherein the instructions, when executed, further cause the processing device to cause the at least one first processor to be updated with the second version of the microcode instruction set in response to successfully validating the second version of the microcode instruction set.

14. The apparatus of claim 11, wherein the instructions, when executed, further cause the processing device to cause the at least one second processor to revert to the first version of the microcode instruction set in response to unsuccessfully validating the second version of the microcode instruction set.

15. The apparatus of claim 14, wherein the instructions, when executed, further cause the processing device to provide, to a remotely disposed computing device, data describing a failed validation of the second version of the microcode instruction set in response to unsuccessfully validating the second version of the microcode instruction set.

16. The apparatus of claim 11, wherein validating the second version of the microcode instruction set comprises determining whether one or more conditions have been satisfied indicating that validation is complete.

17. The apparatus of claim 16, wherein the one or more conditions comprise executing a full instruction set for the second version of the microcode instruction set.

18. The apparatus of claim 16, wherein the one or more conditions comprise passage of a predefined time duration without a failed validation.

19. The apparatus of claim 16, wherein the one or more conditions comprise execution of a particular instruction a predefined number of times without a failed validation.

20. A computer program product comprising a computer readable storage medium, wherein the computer readable storage medium comprises computer program instructions that, when executed:

execute a workload on at least one first processor having a first version of a microcode instruction set;

execute the workload on at least one second processor having a second version of a microcode instruction set, wherein the second version of the microcode instruction set comprises an update of the first version of the microcode instruction set; and validate the second version of the microcode instruction set based on a comparison of output from executing the workload using the at least one first processor and output from executing the workload using the at least one second processor.

* * * * *